(12) United States Patent
Shinohara et al.

(10) Patent No.: US 7,874,673 B2
(45) Date of Patent: Jan. 25, 2011

(54) PROGRESSIVE POWER LENS AND METHOD OF DESIGNING THE SAME

(75) Inventors: Toshihide Shinohara, Chino (JP);
Tadashi Kaga, Minowa-machi (JP);
Ayumu Ito, Minowa-machi (JP);
Moriyasu Shirayanagi, Tokyo (JP)

(73) Assignees: Seiko Epson Corporation, Tokyo (JP);
Seiko Optical Products Co., Ltd.,
Tokyo (JP)

( * ) Notice: Subject to any disclaimer, the term of this patent is extended or adjusted under 35 U.S.C. 154(b) by 0 days.

(21) Appl. No.: 12/749,319

(22) Filed: Mar. 29, 2010

(65) Prior Publication Data

US 2010/0245763 A1  Sep. 30, 2010

(30) Foreign Application Priority Data

Mar. 31, 2009  (JP)  .............................. 2009-084666

(51) Int. Cl.
*G02C 7/06*  (2006.01)
(52) U.S. Cl. ........................ 351/169; 351/177
(58) Field of Classification Search ................. 351/169, 351/177
See application file for complete search history.

(56) References Cited

U.S. PATENT DOCUMENTS

| | | | |
|---|---|---|---|
| 6,199,983 B1 | 3/2001 | Kato et al. ................... | 351/169 |
| 6,685,316 B2 | 2/2004 | Baumbach et al. .......... | 351/169 |
| 6,832,834 B2 * | 12/2004 | Haimerl et al. ............. | 351/161 |
| 7,033,024 B2 * | 4/2006 | Fendt et al. .................. | 351/177 |
| 7,070,274 B2 | 7/2006 | Kamishita et al. | |
| 7,159,981 B2 * | 1/2007 | Kato ........................... | 351/169 |
| 2009/0290125 A1 | 11/2009 | Varnas et al. | |

FOREIGN PATENT DOCUMENTS

| | | | |
|---|---|---|---|
| EP | 1582909 A1 | 10/2005 |
| WO | WO 98/16862 A1 | 4/1998 |
| WO | WO 01/57584 A2 | 8/2001 |
| WO | WO 2005/092173 A1 | 10/2005 |
| WO | 2006116820 A1 | 11/2006 |

OTHER PUBLICATIONS

D. Meister et al., "Progress in the spectacle correction of presbyopia. Part 2: Modern progressive lens technologies" Clin Exp Optom, vol. 91, No. 3, pp. 251-264, 2008.
Michael Keating, "Oblique Central Refraction in Spherocylindrical Corrections with Both Faceform and Pantoscopic Tilt" Optometry & Vision Science, vol. 72, No. 4, pp. 258-265, 1995.
European search report dated Jun. 8, 2010 for corresponding European application 10158349.0 lists the references above.

* cited by examiner

*Primary Examiner*—Scott J Sugarman
(74) *Attorney, Agent, or Firm*—DLA Piper LLP (US)

(57) ABSTRACT

A progressive power lens that prevents degradation in optical characteristics invited by deviation of a pantoscopic angle from the standard value. The lens includes an outer refractive surface and an inner refractive surface, at least one of which is a progressive surface. Because the amount and direction of aberrations generated in distance and near portions are different, correction is given to either or both of the surface powers of the outer and inner surfaces of the lens such that the distance and near portions are differently corrected.

10 Claims, 9 Drawing Sheets

PROGRESSIVE POWER LENS AND METHOD OF DESIGNING THE SAME

The entire disclosure of Japanese Patent Application No. 2009-084666, filed Mar. 31, 2009 is expressly incorporated by reference herein.

BACKGROUND

1. Technical Field

The present invention relates to a progressive power lens for correction of presbyopia and to a method of designing the same.

2. Related Art

Among technical progress of spectacle lenses, lens designing includes a technical field of designing called as custom designing or individual designing.

In this field of designing, spectacle lenses, in particular, progressive power lenses used for correcting presbyopia, are designed to optimize their optical characteristics and optical performance, in consideration not only of opthalmologic prescriptions for users but also of lifestyle different from one individual to another (e.g., intended use of spectacles, scenes, use frequency) and lens-wearing conditions such as positioning of lenses assembled into and worn as spectacles with respect to eyes and orientations and inclinations of the lenses with respect to the line of sight.

According to known methods of manufacturing lenses by custom designing, spectacle lenses are designed with use of customization information related to users' eyes per se and customization information related to users' lifestyles and the like (Document 1: Japanese Patent No. 3944914, Document 2: JP-T-2003-521741, Document 3: WO2005/092173).

For instance, Document 1 discloses a method of manufacturing lenses by custom designing with use of customization information related to users' eyes and customization information related to users' lifestyles. The customization information related to users' eyes contains opthalmologic prescription information such as information about power (spherical power, cylindrical power and cylinder axis), added power and convergence of eyes in a region from a distance portion to a near portion, as well as fitting data for wearing spectacles such as vertex distances, pantoscopic angles and bend angles of frames. According to Document 1, basic designing parameters such as wideness and positions of far point and near point are customized in accordance with the information related to lifestyles, and the progressive surface is computed based on the customized parameters. Further, the optical characteristics are corrected in accordance with the fitting information such as the pantoscopic angles.

In the above hitherto-manufactured spectacle lenses, the pantoscopic angle is defined as a standard setting angle.

FIGS. 1A and 1B show a typical structure of a progressive power lens. FIG. 1A is a front view showing the progressive power lens 1, and FIG. 1B shows a vertical cross-section thereof (hatching is omitted).

In FIGS. 1A and 1B, the progressive power lens 1 includes two refractive surfaces: a front surface 2 (hereinafter referred to as outer surface) and a back surface 3 (hereinafter referred to as inner surface). The progressive power lens 1 also includes: a distance portion 4 for distant vision; a near portion 5 for near vision; and an intermediate corridor 6a of which refractive power is progressively changed from the distance portion 4 to the near portion 5.

The refractive power of the near portion 5 is greater than that of the distance portion 4 by the addition power. A main fixation line 7, which is a position on the lens through which the line of sight frequently passes when the lens is worn, is substantially vertically formed in substantially the middle of the lens. In the near portion 5, the main fixation line 7 comes close to the nose side (right side in FIG. 1A) due to convergence for near-range vision. A region between the distance portion 4 and the near portion 5 is called as an intermediate portion. This intermediate portion includes: an intermediate corridor 6a located in the vicinity of the main fixation line 7, aberration of which is relatively small; and intermediate lateral parts 6b located externally to the intermediate corridor 6a. The intermediate lateral parts 6b, in which astigmatic aberration and distortion aberration are increased, is a region not suitable for clearly viewing an object without distortion.

A fitting point 9, through which the line of sight passes at the primary position (position in a horizontal front view) when the lens is mounted in a spectacle frame, is located on the main fixation line 7, and a prism reference point 8 is located at a position vertically below the fitting point 9 by several millimeters. The prism reference point 8 is frequently set to be located at the center position of the vertical width of a spectacle frame (not shown) when the lens is mounted into the spectacle frame.

The above-described distance portion 4, near portion 5 and intermediate portions 6a and 6b of the progressive power lens are provided on a single surface called as a progressive surface. The progressive surface is provided on the outer surface or on the inner surface. In some lenses, the progressive surface is provided on both of the outer and inner surfaces.

FIGS. 2A and 2B are for explaining a pantoscopic angle and directional components of a refractive power on the main fixation line. FIG. 2A is a front view showing the progressive power lens, and FIG. 2B shows a vertical cross-section passing through the fitting point (hatching is omitted).

In FIGS. 2A and 2B, the prism reference point 8 is provided at the geometric center of the lens. When the lens is mounted into a spectacle frame, this geometric center, i.e., the prism reference point 8, is coincident with the center of the lens shape. As shown in FIG. 2B, in the above-configured lens, an angle formed between a normal line normal to the outer surface at the prism reference point 8 in the cross sectional view and a horizontal plane passing through the prism reference point 8 is defined as a pantoscopic angle PA. While the pantoscopic angle PA may be defined in various ways, the pantoscopic angle herein is defined as an inclination of the normal line normal to the outer surface (front surface) at the center position of the mounted lens with respect to the visual axis at the primary position. Hereinafter in this description, the prism reference point of the outer surface serves as the origin, a Z axis (+) is set in a direction extending toward the eye in the horizontal plane, and a Y axis (+) is set in a direction extending upward in a vertical plane orthogonal to the Z axis. As in FIG. 2B, the pantoscopic angle PA takes positive values (+) when formed in a direction in which the distance portion is away from the eye and the near portion is close to the eye, i.e., in a direction in which the lens is laid down.

In FIG. 2A, a refractive power along the main fixation line 7 is a refractive power within a cross-section 10, and a refractive power in a direction orthogonal to the main fixation line 7 is a refractive power within a cross-section 11.

Lens manufacturers typically design lenses by setting the pantoscopic angle PA, i.e., a design parameter, at a predetermined value within a range of 8 to 12 degrees, and the predetermined value serves as the standard value. Then, lens manufacturers communicate this information to spectacle retailers, and the spectacle retailers perform fitting adjustment on a user's selecting spectacle frame so that the spectacle frame is tilted at the standard pantoscopic angle.

Typically in such hitherto-manufactured progressive power lenses, the pantoscopic angle PA is set at a predetermined value, i.e., a standard value. However, some spectacle frames are difficult to adjust due to their designs and materials, so that the pantoscopic angle may be set at an angle greatly deviated from the pantoscopic angle initially targeted in the designing. Such deviation will result in improper optical performance that is deviated from the originally-targeted optical performance. The reasons therefor will be described in detail below with reference to embodiments.

A progressive power lens of which distance portion is prescribed for myopia use will be described as Conventional embodiment 1. The progressive power lens of Conventional embodiment 1 has: a spherical power SPH of −4.00 diopter; a cylindrical power CYL of 0.00 diopter; an addition power ADD of 2.00 diopter; a corridor length PL of 14 mm; a refractive index N of 1.67; a pantoscopic angle PA of 10 degrees; and a base curve BC of 3.00 diopter. The pantoscopic angle PA is defined as positive when formed in the direction in which the lens is laid down. The base curve BC is a surface power of the outer surface of the distance portion of the progressive power lens, and the corridor length PL is a vertical length of the intermediate corridor 6a.

FIG. 3 is for explaining the optical characteristics on the main fixation line when the progressive power lens of Conventional embodiment 1 is worn at different pantoscopic angles. The graphs (A) to (D) in the upper row illustrate the results when the pantoscopic angle PA=0 degree, the graphs (E) to (H) in the middle row illustrate the results when PA=10 degrees (i.e., the pantoscopic angle set as the standard value) and the graphs (I) to (L) in the lower row illustrate the results when PA=20 degrees.

In the respective rows, the graphs (A), (E) and (I) show the vertical cross-section of the lens, the graphs (B), (F) and (J) show the surface power of the outer surface on the main fixation line, the graphs (C), (G) and (K) show the surface power of the inner surface on the main fixation line, and the graphs (D), (H) and (L) show the refractive performance of the lens when the object is seen through the lens at positions on the main fixation line (hereinafter referred to as transmission refractive power). In progressive power lenses: the distance portion is set for viewing an object long distanced from the eyes (e.g., distanced therefrom by 10 m to infinity); the near portion is set for viewing an object short distanced from the eyes (e.g., distanced therefrom by 40 cm to 25 cm); and the intermediate corridor is set such that its focal distance is gradually changed as the intermediate corridor extends from the distance portion to the near portion. With these settings, the transmission refractive power needs to be evaluated. In each graph, the vertical axis represents Y coordinates vertical from the prism reference point. The horizontal axis represents Z coordinates in the graphs for showing the vertical cross-sections while representing the refractive power in diopter in the graphs for showing the refractive powers.

The lens vertical cross-sectional views (A), (E) and (I) of FIG. 3 illustrate the cross-sectional shapes and actual postures of the spectacle lens 1 when respectively angled at the pantoscopic angles PA of 0, 10 and 20 degrees.

The suffixes m and s respectively represent relevance to a direction along the main fixation line 7 and relevance to a direction orthogonal to the main fixation line 7. The suffixes 1 and 2 respectively represent relevance to the outer surface and relevance to the inner surface. When N represents a refractive index of the lens material, C represents a curvature of the surface (unit: 1/m) and D represents a refractive power (unit: diopter), the following expressions are possible:

Cm1: curvature of a cross-section of the outer surface taken along the main fixation line;
Cs1: curvature of a cross-section of the outer surface taken orthogonally to the main fixation line;
Cm2: curvature of a cross-section of the inner surface taken along the main fixation line;
Cs2: curvature of a cross-section of the inner surface taken orthogonally to the main fixation line;
Dm1: surface power of the cross-section of the outer surface taken along the main fixation line=(N−1)·Cm1;
Ds1: surface power of the cross-section of the outer surface taken orthogonally to the main fixation line=(N−1)·Cs1;
Dm2: surface power of the cross-section of the inner surface taken along the main fixation line=(1−N)·Cm2; and
Ds2: surface power of the cross-section of the inner surface taken orthogonally to the main fixation line=(1−N)·Cs2.

Further, by similarly using the suffixes m and s for respectively representing the relevance to the direction along the main fixation line and the relevance to the direction orthogonal to the main fixation line, the transmission refractive power on the main fixation line can also be expressed as follows:

Pm: a transmission refractive power at the cross-section of the lens taken along the main fixation line; and
Ps: a transmission refractive power at the cross-section of the lens taken orthogonally to the main fixation line.

According to Conventional embodiment 1, no custom designing in view of the pantoscopic angle PA is conducted. Thus, even when the pantoscopic angle PA is changed in accordance with the fitting conditions for manufacturing a user's spectacles, the lens designed for the standard pantoscopic angle PA of 10 degrees is merely put in a changed posture with the same designing maintained. Hence, no matter whether the pantoscopic angle PA is 0, 10 or 20 degrees, the refractive powers of the outer surface and the inner surface remain unchanged. Specifically, the spectacle lens of Conventional embodiment 1 has its progressive surface on the inner surface, so that the outer surface is spherical. Since the base curve is 3.0 diopter (hereinafter, the unit diopter will be abbreviated as (D)), Dm=Ds=3.0 is satisfied constantly in the entire region on the main fixation line. In FIG. 3, Dm represented by a solid line is overlapped with Ds represented by a dotted line to form a single line.

On the other hand, in the progressive surface of the inner surface, the intermediate corridor extends from y=3 mm to y=−11 mm, within which the refractive power is increased from −7 (D) to −5 (D) by the addition power of 2 (D). In the distance portion located above y=3 mm, the surface power Dm2 of the cross-section taken along the main fixation line (represented by a solid line) is gradually shifted toward the positive side as it extends upwardly while the surface power Ds2 of the cross-section taken orthogonally to the main fixation line remains substantially constant. In the intermediate corridor, Dm and Ds are substantially equal. In the near portion, Ds remains substantially constant as it extends downwardly while Dm is slightly shifted toward the negative side. The difference between Dm and Ds means that the lens has a surface astigmatic power. Although the prescription of this lens does not include a prescription for astigmatism, the lens is designed to include a surface astigmatic power in order to correct an aberration generated when the line of sight obliquely passes through the lens at the periphery. This designing technique is utilized in designing progressive power lens in recent years (hereinafter called as off-axis aberration aspherical correction). Advantages of this designing technique are understandable from the graph showing the transmission refractive power at PA of 10 degrees. Specifically, when PA=10 degrees, the transmission refractive power Pm of the cross-section taken along the main fixation line equals to the transmission refractive power Ps of the cross-section taken orthogonally to the transmission refractive power Pm, so that Pm represented by a solid line is overlapped with Ps represented by a dotted line in the graph. In other words, the targeted refraction at the distance portion, intermediate corridor and near portion is obtained.

In contrast, when the pantoscopic angle PA is 0 degree, an astigmatic aberration of approximately 0.3 (D) is generated in the distance portion, and when the pantoscopic angle PA is 20 degrees, an astigmatic aberration of approximately 0.6 (D) is generated in the distance portion (see, the graphs (D) and (L) of FIG. 3).

Considering that a typical lens is prescribed in units of 0.25 (D), the above aberrations are considerably large optical errors. Not only the astigmatic aberrations are present, but also an average refractive power defined as an average between Dm and Ds is deviated from the targeted constant value.

Next, Conventional embodiment 2 will be described below. A progressive power lens of which distance portion is prescribed for hyperopia use will be described as Conventional embodiment 2. The progressive power lens of Conventional embodiment 2 has: a spherical power SPH of 4.00 diopter; a cylindrical power CYL of 0.00 diopter; a cylinder axis AX of 0 degree; an addition power ADD of 2.00 diopter; a corridor length FL of 14 mm; a refractive index N of 1.60; a pantoscopic angle PA of 10 degrees; and a base curve BC of 6.00 diopter.

FIG. 4 is for explaining the optical characteristics on the main fixation line when the progressive power lens of Conventional embodiment 2 is worn at different pantoscopic angles. As in FIG. 3, the graphs (A) to (D) in the upper row illustrate the results when the pantoscopic angle PA=0 degree, the graphs (E) to (H) in the middle row illustrate the results when PA=10 degrees and the graphs (I) to (L) in the lower row illustrate the results when PA=20 degrees. In the respective rows, the graphs (A), (E) and (I) show the vertical cross-section of the lens, the graphs (B), (F) and (J) show the surface power of the outer surface on the main fixation line, the graphs (C), (G) and (K) show the surface power of the inner surface on the main fixation line, and the graphs (D), (H) and (L) show the refractive performance of the lens when the object is seen through the lens at positions on the main fixation line.

Conventional embodiment 2 is different from Conventional embodiment 1 in that the progressive surface is on the outer surface. The outer surface is the progressive surface, and the intermediate corridor extends from y=3 mm to y=-11 mm. Within this range, the surface powers Dm and Ds on the main fixation line are increased from 6 (D) to 8 (D) by the addition power of approximately 2 (D). In the distance portion located on and above y=3 mm, Ds remains substantially constant while Dm is gradually decreased as it extends upward. On the other hand, in the near portion, Ds remains substantially constant while Dm is gradually decreased as it extends downward. The reason therefor is that the designing technique of the off-axis aberration aspherical correction is employed as in Conventional embodiment 1. As a consequence, it is understandable from the graph (H) of FIG. 4 that the targeted optical characteristics are obtained at PA of 10 degrees. However, when PA is 0 degree, large astigmatic aberrations of approximately 0.4 (D) and 0.7 (D) are generated respectively in the distance portion and the near portion, and when PA is 20 degrees, large astigmatic aberrations of approximately 0.8 (D) and 0.3 (D) are generated respectively in the distance portion and the near portion.

As described above, hitherto-manufactured progressive power lenses are designed with the pantoscopic angle being fixed at the standard value. Thus, when the pantoscopic angle cannot be adjusted to be the standard value due to restrictions on structures and materials originated from designs of spectacle frames, the targeted optical performance of the lens will not be obtained and, even worse, the optical characteristics will be greatly deteriorated. Further, it is time- and labor-consuming for retailers to adjust the pantoscopic angle every time.

On the other hand, under an idea of customization designing of progressive power lenses, Document 1 and the like already indicate a concept of conducting optical corrections depending on elements such as the pantoscopic angle, but suggest nothing beyond a rough outline as to the method for realizing the concept. None of Documents 1 to 3 discloses a specific structure of the progressive power lens adaptable to various conditions such as lens prescription, and thus the concept remains impracticable.

SUMMARY

An aspect of the invention provides a progressive power lens capable of preventing degradation in optical characteristics invited by deviation of a pantoscopic angle from the standard value, and also provides a method of designing the progressive power lens.

A progressive power lens according to an aspect of the invention includes: a pair of an outer refractive surface and an inner refractive surface, at least one of the outer refractive surface and the inner refractive surface being a progressive surface, relationships as follows being defined with respect to a lens to be actually worn:

$$SV = SPH + CYL \cdot \{\cos(AX)\}^2 \quad (1);$$

$$Dm1 = (N-1) \cdot Cm1 \quad (2); \text{ and}$$

$$Dm2 = (1-N) \cdot Cm2 \quad (3),$$

where: SPH represents a spherical power; CYL represents a cylindrical power; AX represents a cylinder axis; ADD represents an addition power; N represents a refractive index of the lens; SV represents a vertical refractive power; Cm1 represents a curvature of a cross-section of an outer surface taken along a main fixation line; Cm2 represents a curvature of a cross-section of an inner surface taken along the main fixation line; Dm1 represents a surface power of the cross-section of the outer surface taken long the main fixation line; Dm2 represents a surface power of the cross-section of the inner surface taken along the main fixation line; PA represents a pantoscopic angle, the angle being defined as positive when formed in a direction in which the lens is laid down; Y represents a vertical distance from a prism reference point, the distance being defined as positive when taken in an upper direction of the lens fitted in a frame; Yf represents a Y-coordinate of a point located on the main fixation line and within an upper range of the vertical distance Y of 5<Y<15; and Yn represents a Y-coordinate of a point located on the main fixation line and within a lower range of the vertical distance Y of -15<Y<-5, relationships as follows being defined with respect to a lens designed for a standard pantoscopic angle:

$$Dm1o = (N-1) \cdot Cm1o \quad (2A); \text{ and}$$

$$Dm2o = (1-N) \cdot Cm2o \quad (3A),$$

where: Cm1o represents a curvature of a cross-section of an outer surface taken along the main fixation line; Cm2o represents a curvature of a cross-section of an inner surface taken along the main fixation line; Dm1o represents a surface power of the cross-section of the outer surface taken along the main fixation line; Dm2o represents a surface power of the cross-section of the inner surface taken along the main fixation line; and PAo represents a pantoscopic angle defined as positive when formed in a direction in which the lens is laid down, relationships as follows being defined:

$$\Delta PA = PA - PAo \quad (4); \text{ and}$$

$$\Delta Dm(Y) = \{Dm1(Y) + Dm2(Y)\} - \{Dm1o(Y) + Dm2o(Y)\} \quad (5),$$

where: ΔPA represents a deviation of the pantoscopic angle between the pantoscopic angle of the lens to be actually worn and the standard pantoscopic angle; and ΔDm(Y) represents a difference between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line, and relationships as follows being satisfied:

$$\Delta PA \neq 0 \text{ and } \Delta Dm(Yf) \neq \Delta Dm(Yn) \quad (6).$$

The "lens to be actually worn" herein means a lens customized in consideration of the pantoscopic angle in accordance with this disclosure of the invention.

In view of the fact that a large astigmatic aberration and an average power error are generated in the distance portion and the near portion when a conventional progressive power lens of which pantoscopic angle is set at a standard angle is tilted at an angle other than the standard angle, also in view of the fact that the amount and direction of the aberrations generated in the distance portion and the near portion are respectively different, the aspect of the invention suppresses the above aberrations by giving the correction to either or both of the surface powers of the outer surface and the inner surface of the lens such that the distance portion and the near portion are differently corrected.

Specifically, the aspect of the invention corrects astigmatic aberrations generated in the distance portion and the near portion in accordance with various circumstances of the spectacle lens, under conditions that the outcome ΔDm(Yf) of the formula (5) (i.e., the outcome obtained from a Y coordinate Yf of any point located on the main fixation line and within the vertical distance Y of 5<Y<15) shall not equal to the outcome ΔDm(Yn) of the formula (5) (i.e., the outcome obtained from a Y coordinate Yn of any point located on the main fixation line and within the vertical distance Y of −15<Y<−5). With this arrangement, the aspect of the invention is capable of preventing the degradation in the optical characteristics invited by a deviation of the pantoscopic angle from the standard value.

In the aspect of the invention, the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line may satisfy relationships as follows: SV<0 and ΔPA>0 and ΔDm(Yf)>0.

According to the aspect of the invention, the pantoscopic angle PA of the lens to be actually worn is larger than the standard pantoscopic angle $PA_0$. The aspect of the invention is capable of preventing the degradation in the optical characteristics of the progressive power lens of which distance portion is prescribed for myopia use.

In the aspect of the invention, the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line may satisfy relationships as follows: SV>0 and ΔPA>0 and ΔDm(Yf)<0.

According to the aspect of the invention, the pantoscopic angle PA of the lens to be actually worn is larger than the standard pantoscopic angle $PA_0$. The aspect of the invention is capable of preventing the degradation in the optical characteristics of the progressive power lens of which distance portion is prescribed for hyperopia use.

In the aspect of the invention, the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line may satisfy relationships as follows: SV<0 and ΔPA<0 and ΔDm(Yf)<0.

According to the aspect of the invention, the pantoscopic angle PA of the lens to be actually worn is smaller than the standard pantoscopic angle $PA_0$. The aspect of the invention is capable of preventing the degradation in the optical characteristics of the progressive power lens of which distance portion is prescribed for myopia use.

In the aspect of the invention, the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line may satisfy relationships as follows: SV>0 and ΔPA<0 and ΔDm(Yf)>0.

According to the aspect of the invention, the pantoscopic angle PA of the lens to be actually worn is smaller than the standard pantoscopic angle $PA_0$. The aspect of the invention is capable of preventing the degradation in the optical characteristics of the progressive power lens of which distance portion is prescribed for hyperopia use.

In the aspect of the invention, the vertical refractive power SV, the deviation ΔPA of the pantoscopic angle between the pantoscopic angle of the lens to be actually worn and the standard pantoscopic angle, and a difference ΔDm(Yn) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yn located within the lower range of Y coordinates of the main fixation line may satisfy relationships as follows: SV>0 and ΔPA>0 and ΔDm(Yn)>0.

According to the aspect of the invention, the pantoscopic angle PA of the lens to be actually worn is larger than the standard pantoscopic angle $PA_O$. The aspect of the invention is capable of preventing the degradation in the optical characteristics of the progressive power lens of which distance portion is prescribed for hyperopia use.

In the aspect of the invention, the vertical refractive power SV, the deviation ΔPA of the pantoscopic angle between the pantoscopic angle of the lens to be actually worn and the standard pantoscopic angle, and a difference ΔDm(Yn) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yn located within the lower range of Y coordinates of the main fixation line may satisfy relationships as follows: SV>0 and ΔPA<0 and ΔDm(Yn)<0.

According to the aspect of the invention, the pantoscopic angle PA of the lens to be actually worn is smaller than the standard pantoscopic angle $PA_O$. The aspect of the invention is capable of preventing the degradation in the optical characteristics of the progressive power lens of which distance portion is prescribed for hyperopia use.

In the aspect of the invention, the progressive surface may be formed on an inner surface of the lens According to the aspect of the invention, the outer surface of the lens can be configured in the same shape as a conventional shape.

In the aspect of the invention, the progressive surface may be formed on an outer surface of the lens.

According to the aspect of the invention, the inner surface of the lens can be configured in the same shape as a conventional shape.

A method of designing a progressive power lens according to another aspect of the invention is a method of designing a progressive power lens that includes: a pair of an outer refractive surface and an inner refractive surface, at least one of the outer refractive surface and the inner refractive surface being a progressive surface, the method including: designing the progressive surface to define relationships as follows with respect to a lens to be actually worn:

$$SV = SPH + CYL \cdot \{\cos(AX)\}^2 \quad (1);$$

$$Dm1 = (N-1) \cdot Cm1 \quad (2); \text{ and}$$

$$Dm2 = (1-N) \cdot Cm2 \quad (3),$$

where: SPH represents a spherical power; CYL represents a cylindrical power; AX represents a cylinder axis; ADD represents an addition power; N represents a refractive index of the lens; SV represents a vertical refractive power; Cm1 represents a curvature of a cross-section of an outer surface taken along a main fixation line; Cm2 represents a curvature of a cross-section of an inner surface taken along the main fixation line; Dm1 represents a surface power of the cross-section of the outer surface taken long the main fixation line; Dm2 represents a surface power of the cross-section of the inner surface taken along the main fixation line; PA represents a pantoscopic angle, the angle being defined as positive when formed in a direction in which the lens is laid down; Y represents a vertical distance from a prism reference point, the distance being defined as positive when taken in an upper direction of the lens fitted in a frame; Yf represents a Y-coordinate of a point located on the main fixation line and within the vertical distance Y of 5<Y<15; and Yn represents a Y-coordinate of a point located on the main fixation line and within the vertical distance Y of −15<Y<−5, designing the progressive surface to define relationships as follows with respect to a lens designed for a standard pantoscopic angle:

$$Dm1o = (N-1) \cdot Cm1o \quad (2A); \text{ and}$$

$$Dm2o = (1-N) \cdot Cm2o \quad (3A),$$

where: Cm1o represents a curvature of a cross-section of an outer surface taken along the main fixation line; Cm2o represents a curvature of a cross-section of an inner surface taken along the main fixation line; Dm1o represents a surface power of the cross-section of the outer surface taken along the main fixation line; Dm2o represents a surface power of the cross section of the inner surface taken along the main fixation line; and PAo represents a pantoscopic angle defined as positive when formed in a direction in which the lens is laid down, designing the progressive surface to define relationships as follows:

$$\Delta PA = PA - PAo \quad (4); \text{ and}$$

$$\Delta Dm(Y) = \{Dm1(Y) + Dm2(Y)\} - \{Dm1o(Y) + Dm2o(Y)\} \quad (5),$$

where: ΔPA represents a deviation of the pantoscopic angle between the pantoscopic angle of the lens to be actually worn and the standard pantoscopic angle; and ΔDm(Y) represents a difference between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line, and designing the progressive surface to satisfy relationships as follows:

$$\Delta PA \neq 0 \text{ and } \Delta Dm(Yf) \neq \Delta Dm(Yn) \quad (6).$$

According to the aspect of the invention, the method of designing the progressive power lens capable of providing the above advantages can be provided.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

Figure 1A:
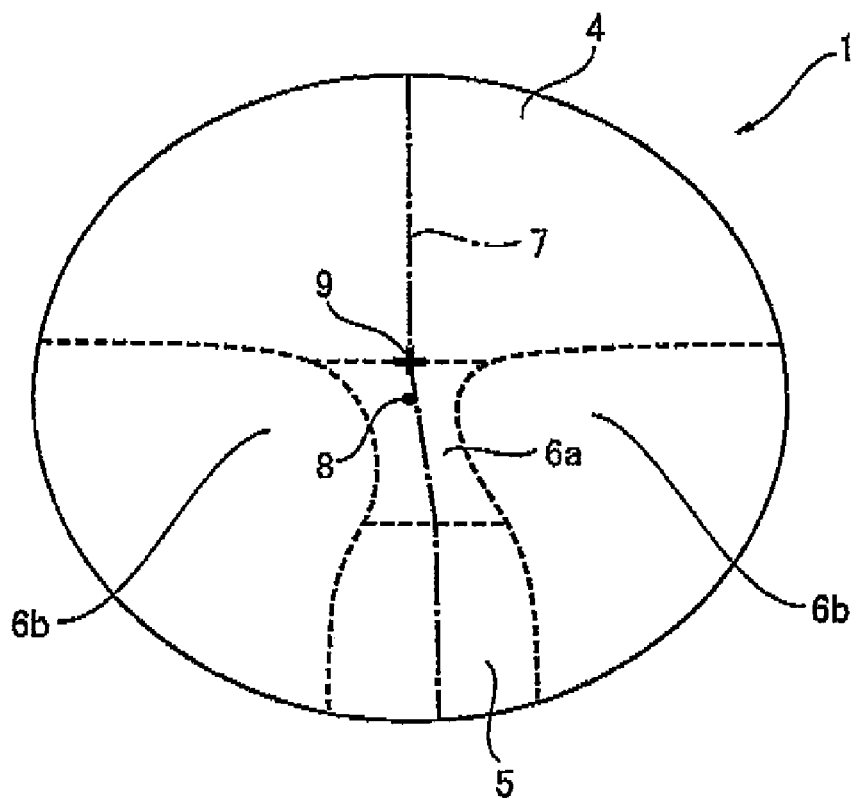
FIG. 1A is a front view of a progressive power lens.
Figure 1B:
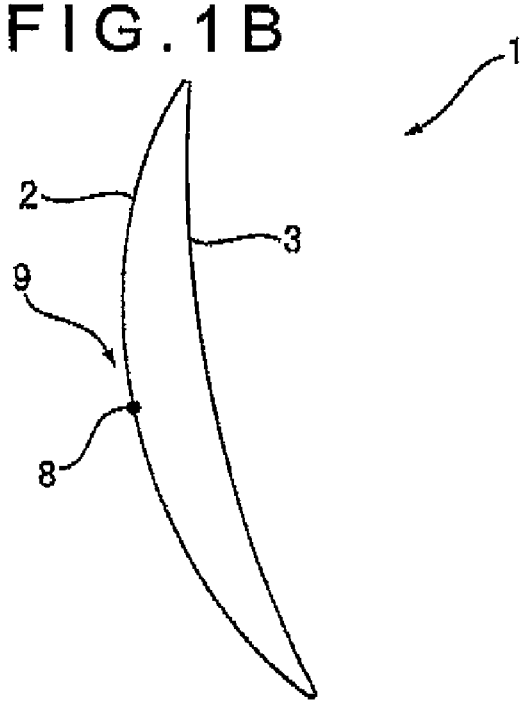
FIG. 1B is a vertical cross-sectional view of the progressive power lens.
Figure 2A:
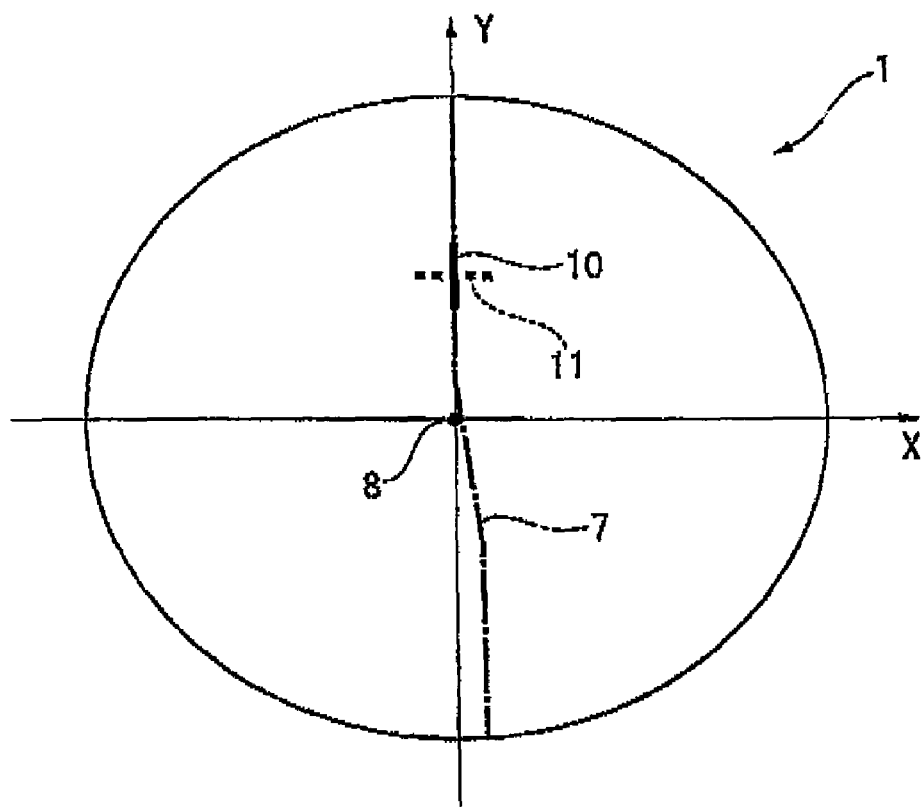
FIG. 2A is a front view of the progressive power lens, for explaining directional components of a refractive power on the main fixation line.
Figure 2B:
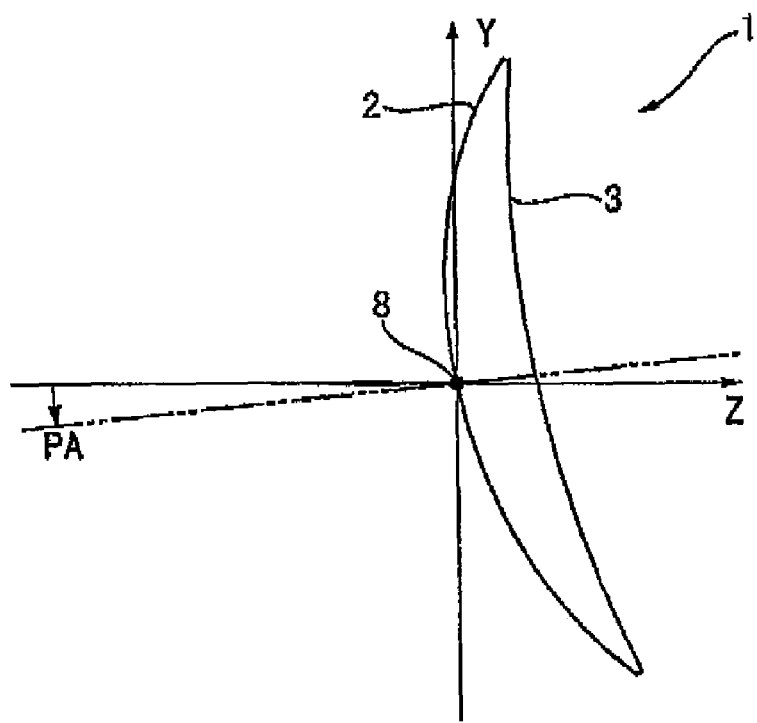
FIG. 2B is a vertical cross-sectional view of the progressive power lens on the fitting point, for explaining a pantoscopic angle.

Exemplary embodiment(s) of the invention will be described below with reference to the attached drawings. The basic structure of the progressive power lens of this exemplary embodiment is as illustrated in FIGS. 1A, 1B, 2A and 2B.

Briefly explaining about this exemplary embodiment, the progressive power lens 1 includes two refractive surfaces: namely, a front surface 2 serving as an outer surface and a back surface 3 serving as an inner surface, as illustrated in FIGS. 1A, 1B, 2A and 2B. The progressive power lens 1 also includes a distance portion 4, a near portion 5 and an intermediate corridor 6a. A main fixation line 7 is substantially vertically formed substantially at the middle of the lens. Intermediate lateral parts 6b are provided externally to the intermediate corridor 6a. A fitting point 9 is located on the main fixation line 7, and a prism reference point 8 is located at a position vertically below the fitting point 9 by several millimeters. The distance portion 4, near portion 5 and intermediate portions 6a and 6b are provided within a single surface called as a progressive surface. In this exemplary embodiment, the progressive surface is provided on a lens inner surface or a lens outer surface, or alternatively provided on both of the lens inner surface and the lens outer surface.

An angle formed between a normal line normal to the outer surface at the prism reference point 8 in the cross sectional view and a horizontal plane passing through the prism reference point 8 is defined as a pantoscopic angle PA.

In this exemplary embodiment, with respect to the lens to be actually worn, the following relationships are defined:

$$SV = SPH + CYL \cdot \{\cos(AX)\}^2 \quad (1)$$

$$Dm1 = (N-1) \cdot Cm1 \quad (2)$$

$$Ds1 = (N-1) \cdot Cs1 \quad (7)$$

$$Dm2 = (1-N) \cdot Cm2 \quad (3)$$

$$Ds2 = (1-N) \cdot Cs2 \quad (8)$$

In the formulae: SPH represents a spherical power; CYL represents a cylindrical power; AX represents a cylinder axis; ADD represents an addition power; N represents a refractive index of the lens; SV represents a vertical refractive power; Cm1 represents a curvature of a cross-section of the outer surface taken along the main fixation line; Cs1 represents a curvature of a cross-section of the outer surface taken orthogonally to the main fixation line; Cm2 represents a curvature of a cross-section of the inner surface taken along the main fixation line; Cs2 represents a curvature of a cross-section of the inner surface taken orthogonally to the main fixation line; Dm1 represents a surface power of the cross-section of the outer surface taken long the main fixation line; Ds1 represents a surface power of the cross-section of the outer surface taken orthogonally to the main fixation line; Dm2 represents a surface power of the cross-section of the inner surface taken along the main fixation line; Ds2 represents a surface power of the cross-section of the inner surface taken orthogonally to the main fixation line; PA represents a pantoscopic angle, the angle being defined as positive when formed in a direction in which the lens is laid down; Y represents a vertical distance from the prism reference point, the distance being defined as positive when taken in an upper direction of the lens fitted in a frame; Yf represents a Y-coordinate of a point located on the main fixation line and within the vertical distance Y of $5<Y<15$; and Yn represents a Y-coordinate of a point located on the main fixation line and within the vertical distance Y of $-15<Y<-5$.

Also, with respect to the lens designed for a standard pantoscopic angle, the following relationships are defined:

$$Dm1o = (N-1) \cdot Cm1o \quad (2A)$$

$$Ds1o = (N-1) \cdot Cs1o \quad (7A)$$

$$Dm2o = (1-N) \cdot Cm2o \quad (3A)$$

$$Ds2o = (1-N) \cdot Cs2o \quad (8A)$$

In the formulae: Cm1o represents a curvature of a cross-section of the outer surface taken along the main fixation line; Cs1o represents a curvature of a cross-section of the outer surface taken orthogonally to the main fixation line; Cm2o represents a curvature of a cross-section of the inner surface taken along the main fixation line; Cs2o represents a curvature of a cross-section of the inner surface taken orthogonally to the main fixation line; Dm1o represents a surface power of the cross-section of the outer surface taken along the main fixation line; Ds1o represents a surface power of the cross-section of the inner surface taken orthogonally to the main fixation line; Dm2o represents a surface power of the cross-section of the inner surface taken along the main fixation line; Ds2o represents a surface power of the cross-section of the inner surface taken orthogonally to the main fixation line; and PAo represents a pantoscopic angle defined as positive when formed in a direction in which the lens is laid down.

Also, the following relationships are defined:

$$\Delta PA = PA - PAo \quad (4)$$

$$\Delta Dm(Y) = \{Dm1(Y) + Dm2(Y)\} - \{Dm1o(Y) + Dm2o(Y)\} \quad (5)$$

$$\Delta Ds(Y) = \{Ds1(Y) + Ds2(Y)\} - \{Ds1o(Y) + Ds2o(Y)\} \quad (9)$$

In the formulae: ΔPA represents a deviation of the pantoscopic angle between the pantoscopic angle PA of the lens to be actually worn and the standard pantoscopic angle $PA_0$; ΔDm(Y) represents a difference between the sum of the surface powers of the cross-sections of the outer surface and the inner surface of the lens to be actually worn taken along the main fixation line and the sum of the surface powers of the cross-sections of the outer surface and the inner surface of the standard lens taken along the main fixation line; and ΔDs(Y) represents a difference between the sum of the surface powers of the cross-sections of the outer surface and the inner surface of the lens to be actually worn taken orthogonally to the main fixation line and the sum of the surface powers of the cross-sections of the outer surface and the inner surface of the standard lens taken orthogonally to the main fixation line.

The progressive power lens 1 of this exemplary embodiment satisfies the relationships of:

$$\Delta PA \neq 0 \text{ and } \Delta Dm(Yf) \neq \Delta Dm(Yn) \quad (6)$$

According to this exemplary embodiment, the spectacle lens is designed so that the relationships represented by the above formulae are satisfied.

Examples of this exemplary embodiment will be described below.

Embodiment 1

With Embodiment 1, a progressive power lens of which distance portion is prescribed for myopia use will be described. Embodiment 1, which is based on improvement to Conventional embodiment 1, is a progressive power lens of which: spherical power SPH is −4.00 diopter; cylindrical power CYL is 0.00 diopter; cylinder axis AX is 0 degree; addition power ADD is 2.00 diopter; corridor length PL is 14 mm; refractive index N is 1.67; and base curve BC is 3.00 diopter, as in Conventional embodiment 1. As mentioned above, the pantoscopic angle PA is defined as positive when formed in the direction in which the lens is laid down.

Figure 3:
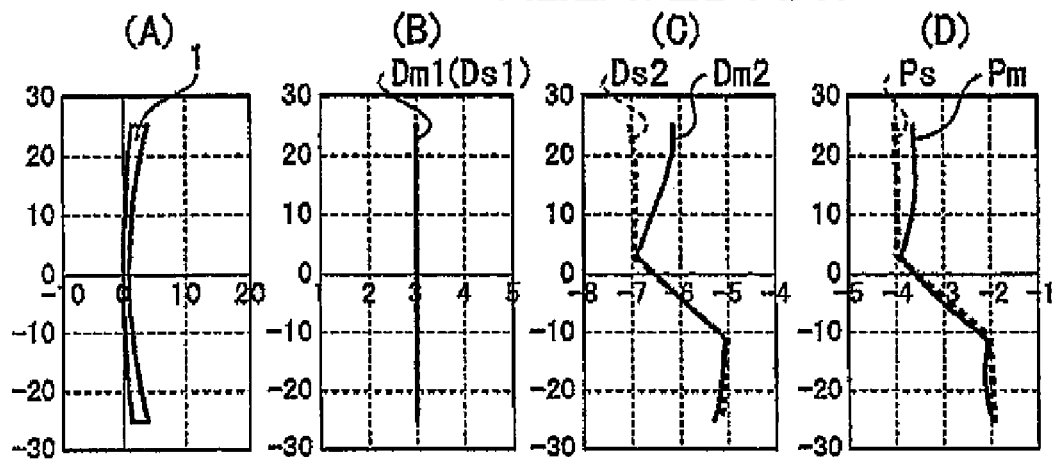
FIG. 3 shows graphs that show the optical characteristics of a progressive power lens according to Conventional embodiment 1, wherein the pantoscopic angle is varied to different angles.
Figure 3:
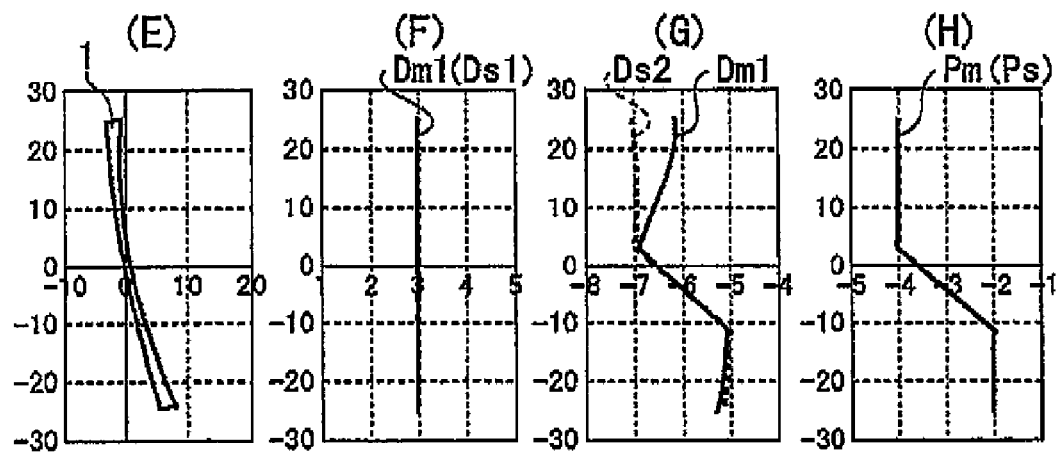
Figure 3:
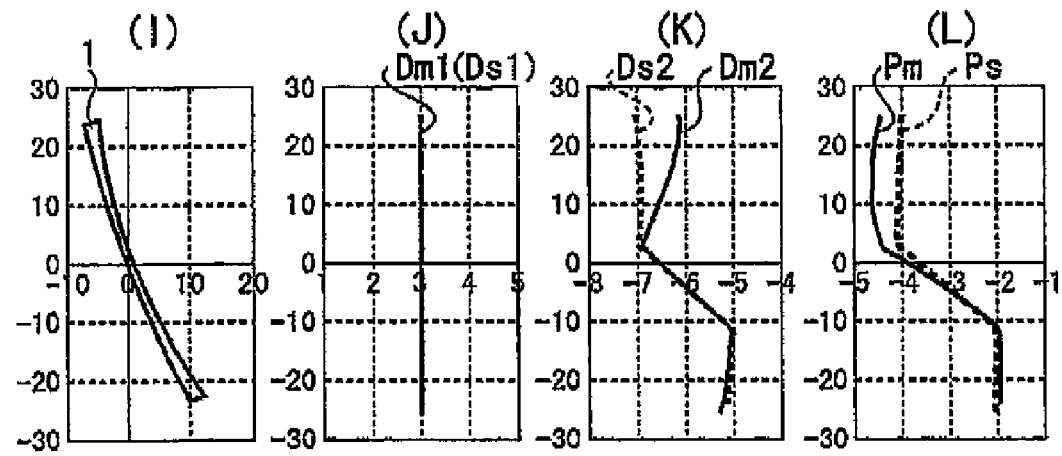
Figure 4:
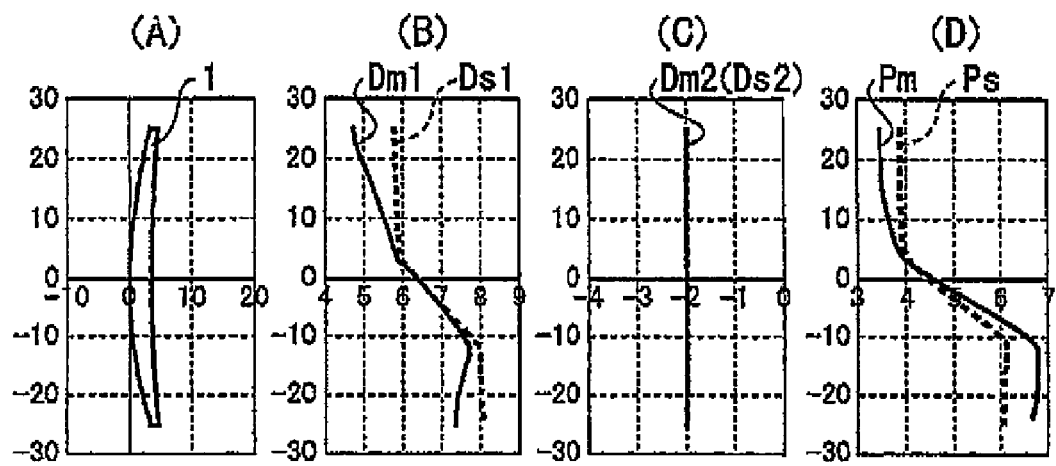
FIG. 4 shows graphs that show the optical characteristics of a progressive power lens according to Conventional embodiment 2, wherein the pantoscopic angle is varied to different angles.
Figure 4:
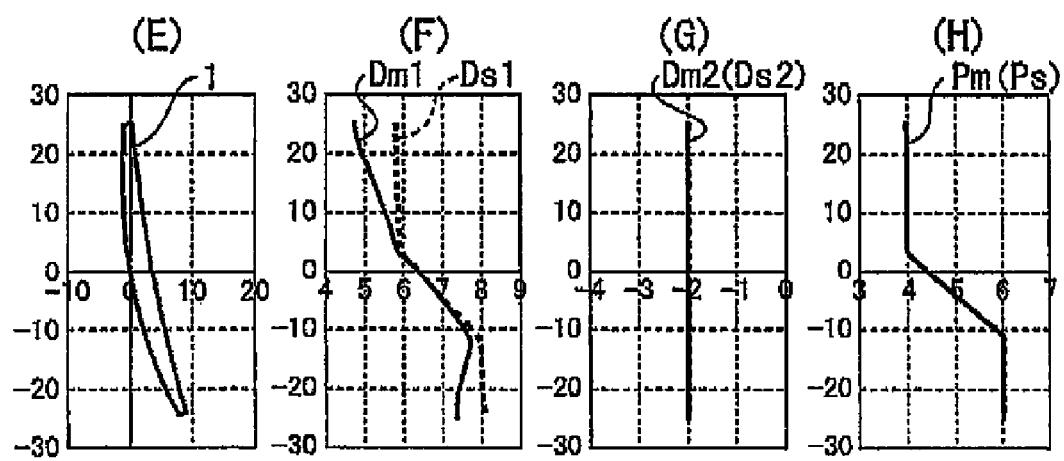
Figure 4:
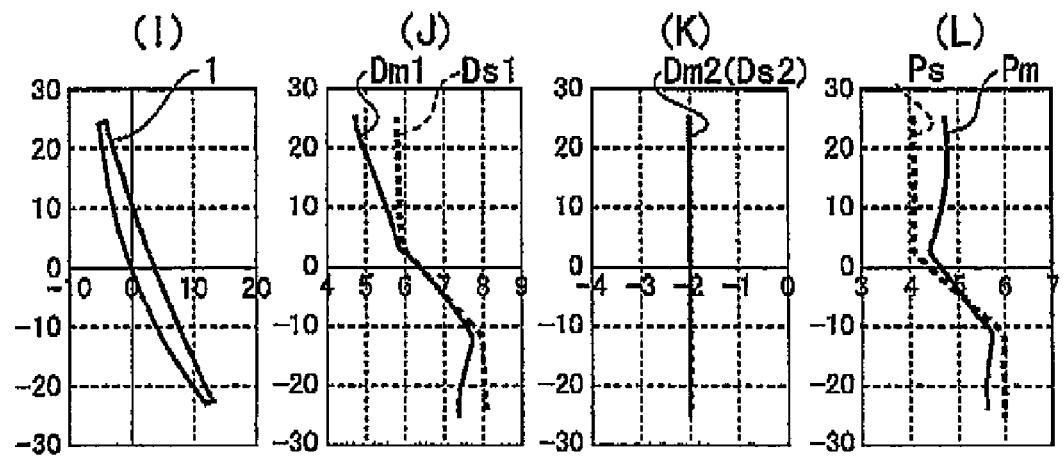
Figure 5:
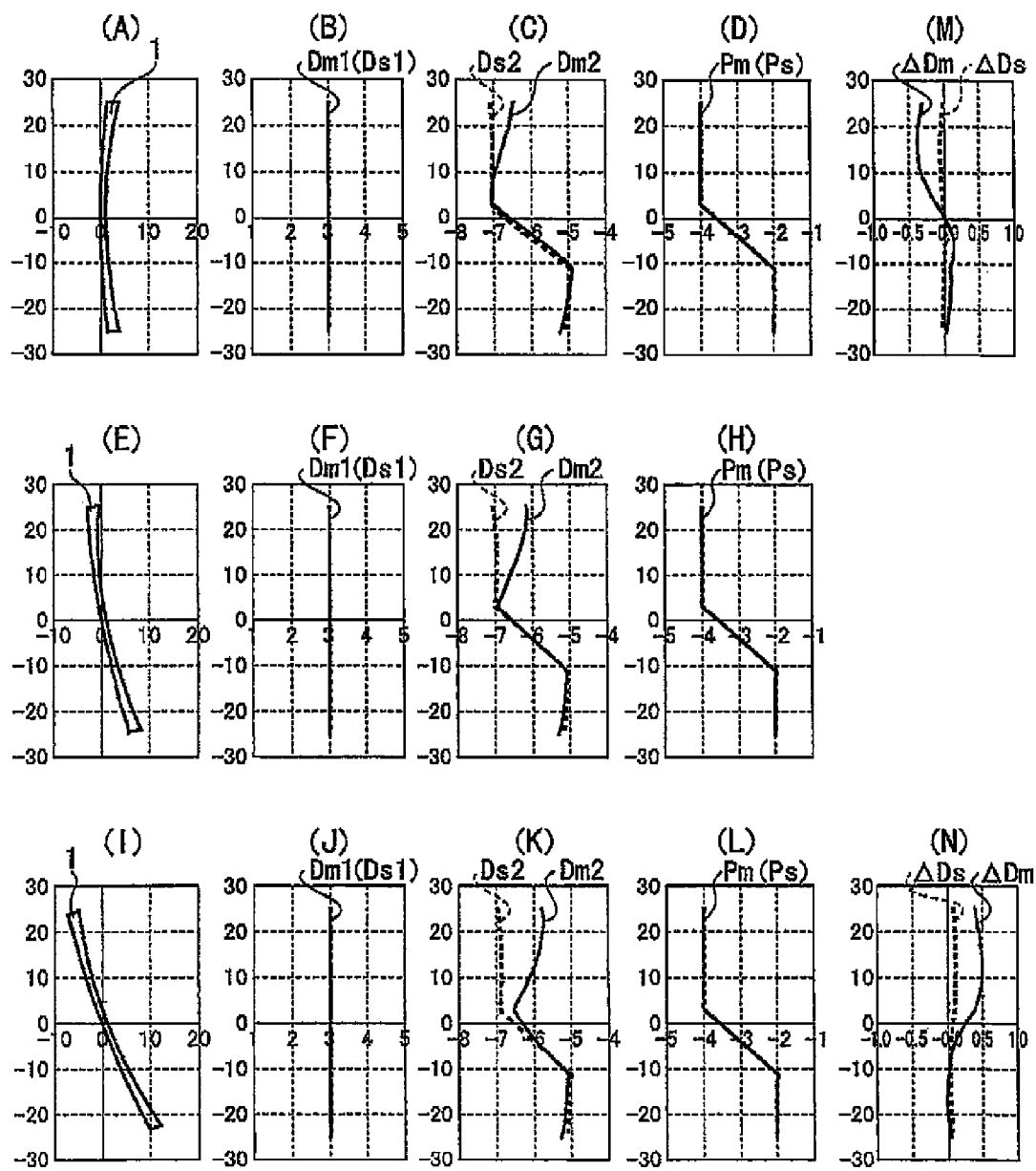
FIG. 5 shows graphs that show the optical characteristics of a progressive power lens according to Embodiment 1 of the invention, wherein the pantoscopic angle is varied to different angles.

FIG. 5, which shows the results of Embodiment 1, is arranged similarly to FIGS. 3 and 4. However, the surface power correction values when the pantoscopic angle PA is 0 degree and 20 degree, i.e., other than standard 10 degrees, are newly added and illustrated in FIG. 5.

Specifically, the graphs (A) to (D) in the upper row illustrate the results when the pantoscopic angle PA=0 degree, the graphs (E) to (H) on the middle row illustrate the results when PA=10 degrees (i.e., the pantoscopic angle set as the standard value) and the graphs (I) to (L) on the lower row illustrate the results when PA=20 degrees. In the respective rows, the graphs (A), (E) and (I) show the vertical cross-section of the lens, the graphs (B), (F) and (J) show the surface power of the outer surface on the main fixation line, the graphs (C), (G) and (K) show the surface power of the inner surface on, the main fixation line, and the graphs (D), (H) and (L) show the refractive performance of the lens when the object is seen through the lens at positions on the main fixation line (hereinafter referred to as transmission refractive power). The graph (M) in the upper row shows the surface power correction value when the pantoscopic angle PA=0 degree while the graph (N) in the lower row shows the surface power correction value when the pantoscopic angle PA=20 degrees.

The surface power correction values ΔDm and ΔDs represent correction refractive-power values added to the refractive powers Pm and Ps of the outer surface and inner surface of a lens designed for use at the standard pantoscopic angle PAo of 10 degrees, in order to optimize the optical performance when the lens is at an actual pantoscopic angle PA. In other words, the surface power correction values ΔDm and ΔDs are defined by the formulae (5) and (9) described below:

$$\Delta Dm(Y) = \{Dm1(Y) + Dm2(Y)\} - \{Dm1o(Y) + Dm2o(Y)\} \quad (5)$$

$$\Delta Ds(Y) = \{Ds1(Y) + Ds2(Y)\} - \{Ds1o(Y) + Ds2o(Y)\} \quad (9)$$

In the formulae: Dm and Ds represent refractive powers of the progressive surface on the main fixation line, the progressive surface being designed to be optimized at the pantoscopic angle PA; Dmo and Dso, which are expressed with the addition of suffix o, represent parameters of a lens designed to be optimized at the standard pantoscopic angle; and Y represents a position coordinate on the main fixation line.

When Embodiment 1 in FIG. 5 is compared with Conventional embodiment 1 prior to improvement, astigmatic aberration and deviations of average refractive power observed mainly at the distance portion in the graphs (D) and (L) of FIG. 3 (i.e., which illustrate transmission refractive powers of Conventional embodiment 1 at the pantoscopic angles PA of 0 degree and 20 degrees) are substantially no longer present. In order for this optimization to be reached, the surface power of the inner progressive surface is corrected, of which refractive-power correction values (amounts) are shown in the graphs (M) and (N) of FIG. 5.

In the graphs (M) and (N) of FIG. 5, when a negatively-prescribed progressive power lens is raised from the standard pantoscopic angle PA of 10 degrees to the pantoscopic angle PA of 0 degree, ΔDs hardly changes throughout the entire region, but Dm is gradually reduced in the negative direction toward the upper side of the distance portion, so that the refractive power is corrected by approximately −0.4 (D). On the other hand, the correction amount in the portion from the intermediate corridor to the near portion, which is expressed with the sign opposite to that of the distance portion, is as small as approximately 0.1 (D).

In contrast, when the lens is laid down so that the pantoscopic angle PA becomes from 10 degrees to 20 degrees, Ds hardly changes, but Dm greatly changes. In other words, Dm remains substantially zero in the portion from the near portion to the intermediate corridor, but the correction amount is gradually increased in the positive direction in the portion from substantially the middle of the intermediate corridor to the upper side, so that the refractive power is corrected by approximately 0.5 (D).

When the vertical range of a progressive power lens mounted and used in a spectacle frame is considered and representative positions of the distance portion and the near portion on the main fixation line are represented by Yf and Yn respectively, Yf and Yn can be defined as follows:

Y: a vertical distance from the prism reference point (of which value is positive when taken in the upper direction of the mounted lens);

Yf: any Y coordinate on the main fixation line and within the range of 5<Y<15; and Yn: any Y coordinate on the main fixation line and within the range of −15<Y<−5.

The representative position of the distance portion or the near portion on the main fixation line means, for instance, a position set by the manufacturer as a position for a measurement of distance portion power or a point for a measurement of near portion power. The optical characteristics of a progressive power lens greatly depend on corridor length, and the corridor length is variously set in accordance with the design concept. In many progressive power lenses, the ranges of Yf and Yn defined as above can cover substantially a range in which the distance portion and the near portion are used on the main fixation line.

With respect to the range Yf of the distance portion on the main fixation line and the range Yn of the near portion on the main fixation line, Table 1 shows the surface power correction values. In Embodiment 1, the vertical refractive power SV is −4.00 (D) in accordance with the formula (1).

TABLE 1

| Vertical Refractive Power SV | Pantoscopic Angle PA | Surface Power Correction Value | |
|---|---|---|---|
| | | ΔDm (Yf) | ΔDm (Yn) |
| −4.00 | 0 | −0.4<<−0.2 | +0.1 |
| | 20 | +0.4<<+0.5 | 0.0<<+0.1 |

As shown in Table 1, when the pantoscopic angle is smaller than the standard pantoscopic angle PAo (PA<PAo) in a progressive power lens having an inner progressive surface and a negative prescription (SV<0) of vertical refractive power SV=−4.0 (D), the following relationships are satisfied:

ΔDm(Yf)≠ΔDm(Yn)

ΔDm(Yf)<0

When the pantoscopic angle is larger than the standard pantoscopic angle (PA>PAo), the following relationships are satisfied:

ΔDm(Yf)≠ΔDm(Yn)

ΔDm(Yf)>0

ΔDm(Yn) exhibits as small a change as 0.1 (D) or less, which is not confirmed as a clear tendency.

Embodiment 2

With Embodiment 2, a progressive power lens of which distance portion is prescribed for hyperopia use will be described. Embodiment 2, which is based on improvement to Conventional embodiment 2, is a progressive power lens of which: spherical power SPH is 4.00 diopter; cylindrical power CYL is 0.00 diopter; cylinder axis AX is 0 degree; addition power ADD is 2.00 diopter; corridor length PL is 14 mm; refractive index N is 1.60; and base curve BC is 6.00 diopter, as in Conventional embodiment 2.

Figure 6:
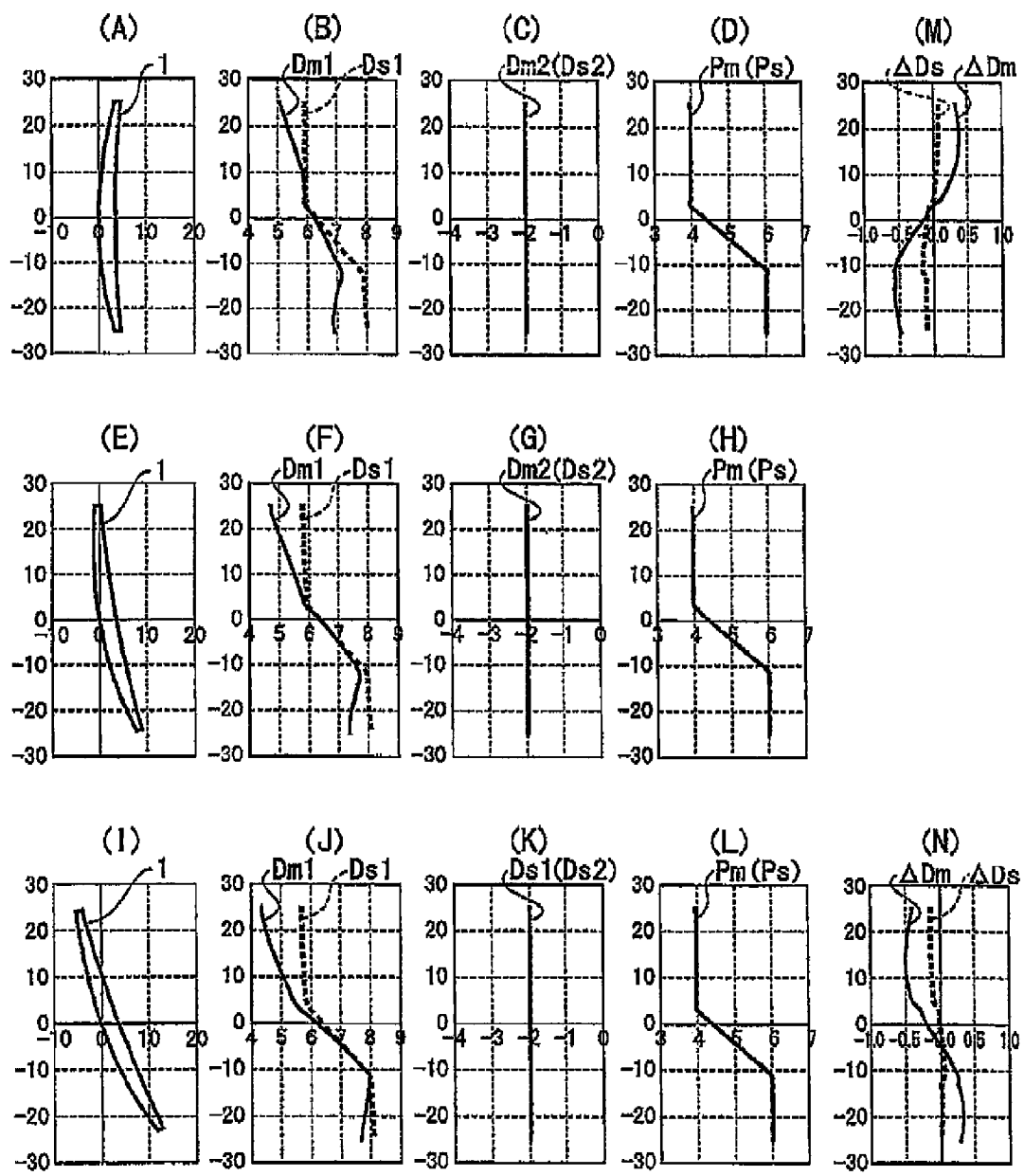
FIG. 6 shows graphs that show the optical characteristics of a progressive power lens according to Embodiment 0.2 of the invention, wherein the pantoscopic angle is varied to different angles.

FIG. 6 shows the results of Embodiment 2, of which arrangement is the same as that of FIG. 5.

When Embodiment 2 in FIG. 6 is compared with Conventional embodiment 2 prior to improvement, astigmatic aberration and deviations of average refractive power observed in the graphs (D) and (L) of FIG. 4 (i.e., which illustrate transmission refractive powers of Conventional embodiment 2 at the pantoscopic angles PA of 0 degree and 20 degrees) are substantially no longer present. In order for this optimization to be reached, the surface power of the inner progressive surface is corrected, of which refractive-power correction values (amounts) are shown in the graphs (M) and (N) of FIG. 6.

In the graphs (M) and (N) of FIG. 6, when the lens is raised from the standard PA of 10 degrees to PA of 0 degree, ΔDs hardly changes in the entire region, but Dm is gradually increased in the positive direction toward the upper side of the distance portion, so that the refractive power is corrected by approximately 0.4 (D). On the other hand, the correction amount in the portion from the intermediate corridor to the near portion is expressed with the sign opposite to that of the distance portion.

In contrast, when the lens is laid down so that PA becomes from 10 degrees to 20 degrees, changes of ΔDs are small, but changes of ΔDm are great. In other words, ΔDm has a correction value in the positive direction in the portion from the near portion to the intermediate corridor, but the correction amount is gradually increased in the negative direction in the portion from substantially the middle of the intermediate corridor to the upper side, so that the refractive power is corrected by approximately −0.5 (D).

Table 2 shows design parameters of the progressive power lens of Embodiment 2. The progressive power lens of Embodiment 2 is designed for use at the standard pantoscopic angle PA of 10 degrees as in Conventional embodiment 2 but is corrected for use at the pantoscopic angle PA of 0 degree and 20 degrees.

In Embodiment 2, the vertical refractive power SV is 4.00 in accordance with the formula (1).

Table 2 shows the surface power correction values.

TABLE 2

| Vertical Refractive Power SV | Pantoscopic Angle PA | Surface Power Correction Value | |
|---|---|---|---|
| | | ΔDm (Yf) | ΔDm (Yn) |
| 4.00 | 0 | +0.1<<+0.4 | −0.6<<−0.4 |
| | 20 | −0.5<<−0.4 | 0.0<<+0.3 |

As shown in Table 2, when the pantoscopic angle PA is smaller than the standard pantoscopic angle PAo (PA<PAo) in a progressive power lens having an outer progressive surface and a positive prescription (SV>0) of which vertical refractive power SV=+4.00 (D), the following relationships are satisfied:

ΔDm(Yf)≠ΔDm(Yn)

ΔDm(Yf)>0

ΔDm(Yn)<0

When the pantoscopic angle PA is larger than the standard pantoscopic angle PAo (PA>PAo), the following relationships are satisfied:

ΔDm(Yf)≠ΔDm(Yn)

ΔDm(Yf)<0

ΔDm(Yn)>0

Embodiment 3

Embodiment 3 is a progressive power lens having its progressive surface on the outer surface and performing the correction on the inner surface.

The progressive power lens of Embodiment 3 has: a spherical power SPH of −6.00 diopter; a cylindrical power CYL of 0.00 diopter; a cylinder axis AX of 0 degree; an addition power ADD of 2.00 diopter; a corridor length PL of 12 mm; a refractive index N of 1.74; and a base curve BC of 2.00 diopter.

Figure 7:
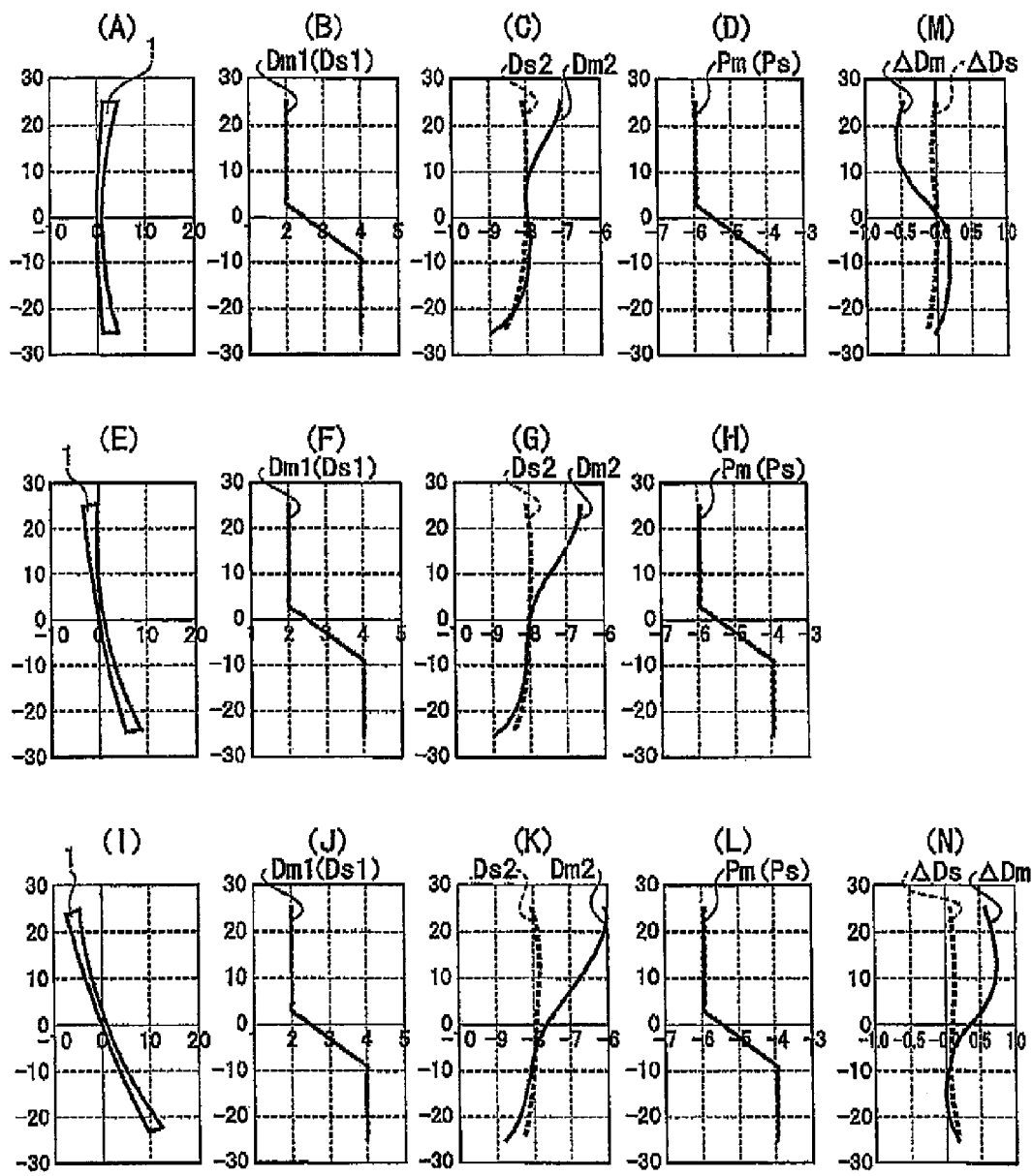
FIG. 7 shows graphs that show the optical characteristics of a progressive power lens according to Embodiment 3 of the invention, wherein the pantoscopic angle is varied to different angles.

FIG. 7 shows the results of Embodiment 3, of which arrangement is the same as that of FIG. 5.

In FIG. 7, irrespective of the value of the pantoscopic angle PA, Dm1 and Ds1 remain of the same value on the outer surface side, and exhibit surface power changes observed in a typical progressive power lens in a region from the distance portion to the near portion. On the other hand, the refractive surface of the inner surface is a so-called aspherical surface, of which Dm2 and Ds2 are partially different and non-constantly change toward the upper side and lower side of the lens. According to the graph (H) of FIG. 7 wherein the transmission refractive power at the standard pantoscopic angle PAo of 10 degrees is shown, the targeted transmission refractive power is obtained from the aspherical surface.

On the other hand, when the pantoscopic angle is 0 degree, the transmission refractive power in the graph (D) of FIG. 7 is exhibited in relation to the aspherical correction of the inner surface at PA of 10 degrees, and the transmission refractive power in the graph (L) of FIG. 7 is exhibited in relation to the aspherical correction of the inner surface at the pantoscopic angle PA of 20 degrees. According to the graphs (D) and (L) of FIG. 7, the corrected aspherical surface can favorably correct the transmission refractive power even when the pantoscopic angle PA is 0 degree or 20 degrees. The surface power correction value in accordance with the changes in the pantoscopic angle PA is shown in the graphs (M) and (N) of FIG. 7.

Table 3 shows the surface power correction values.

In Embodiment 3, the vertical refractive power SV is −6.00 in accordance with the formula (1).

TABLE 3

| Vertical Refractive Power SV | Pantoscopic Angle PA | Surface Power Correction Value | |
|---|---|---|---|
| | | ΔDm (Yf) | ΔDm (Yn) |
| −6.00 | 0 | −0.6<<−0.4 | +0.2 |
| | 20 | +0.6<<+0.7 | 0.0<<+0.1 |

As shown in Table 3, when the pantoscopic angle PA is smaller than the standard pantoscopic angle PAo (PA<PAo) in a progressive power lens having an outer progressive surface and a negative prescription (SV<0) of which vertical refractive power SV=−6.00 (D), the following relationships are satisfied:

ΔDm(Yf)≠ΔDm(Yn)

ΔDm(Yf)<0

When the pantoscopic angle is larger than the standard pantoscopic angle PAo (PA>PAo), the following relationships are satisfied:

ΔDm(Yf)≠ΔDm(Yn)

ΔDm(Yf)>0

Embodiment 4

Embodiment 4 is a progressive power lens having its progressive surfaces on the outer surface and the inner surface and performing the correction on the progressive surface of the inner surface.

The progressive power lens of Embodiment 4 has: a spherical power SPH of +2.00 diopter; a cylindrical power CYL of 0.00 diopter; a cylinder axis AX of 0 degree; an addition power ADD of 2.00 diopter; a corridor length PL of 14 mm; a refractive index N of 1.67; and a base curve BC of 5.00 diopter.

Figure 8:
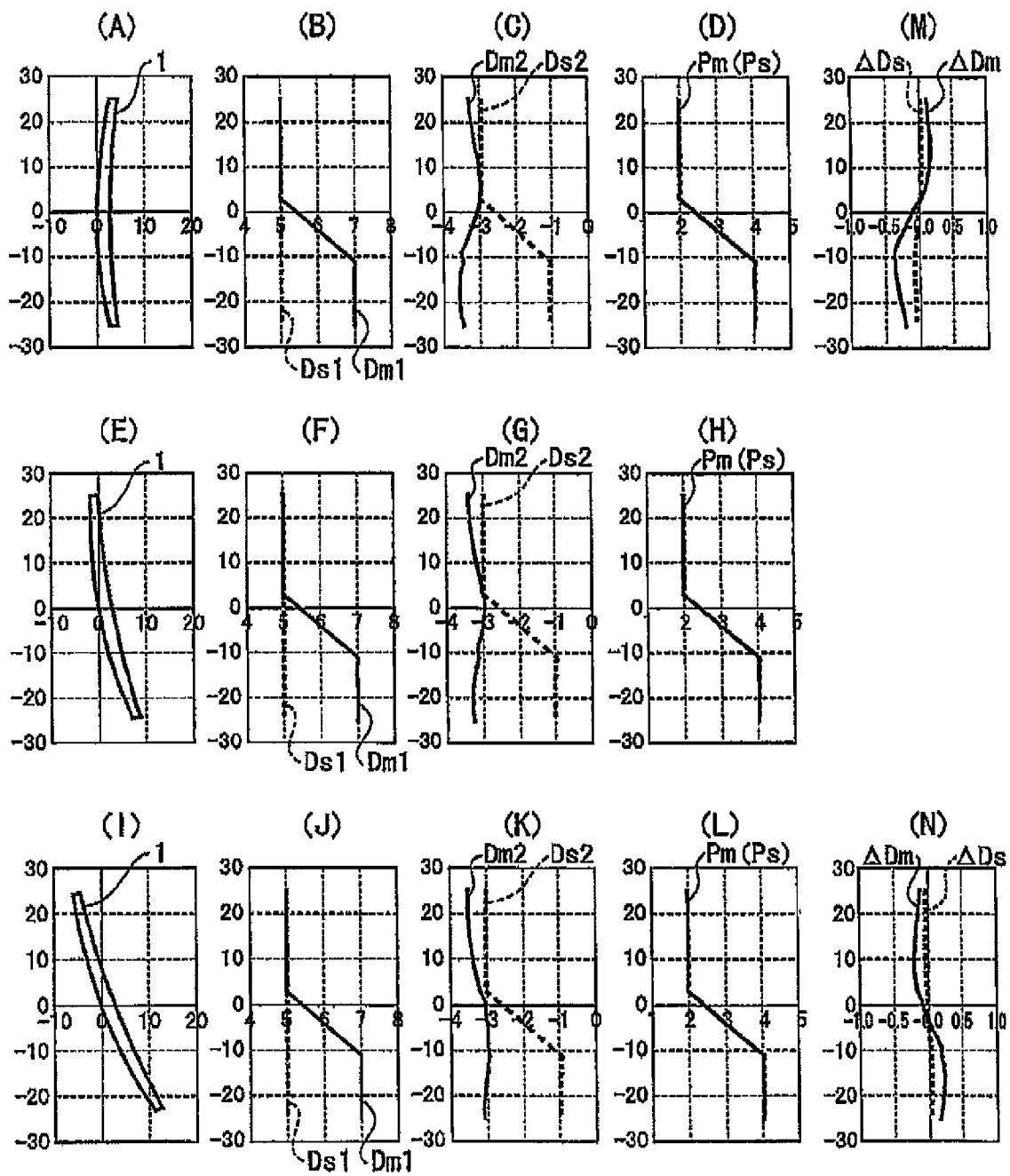
FIG. 8 shows graphs that show the optical characteristics of a progressive power lens according to Embodiment 4 of the invention, wherein the pantoscopic angle is varied to different angles.

FIG. 8 shows the results of Embodiment 4, of which arrangement is the same as that of FIG. 5.

In the graphs (B), (F) and (J) of FIG. 8, irrespective of the value of the pantoscopic angle PA, the progressive surface of the outer surface remains the same. In this progressive surface, Dm1 exhibits surface power changes observed in a typical progressive power lens in a region from the distance portion to the near portion. On the other hand, Ds1 remains constant throughout the distance portion, intermediate portion and near portion. In contrast, in the refractive surface of the inner surface, Dm2 and Ds2 are partially different. Ds2 exhibits surface power changes observed in a typical progressive power lens in a region from the distance portion to the near portion, and Dm2 changes upward and downward though the change of Dm2 is not as great as that of Ds2.

According to the graph (H) of FIG. 8, the transmission refractive power at the standard pantoscopic angle PA of 10 degrees has reached the targeted level owing to the two progressive surfaces. On the other hand, when the pantoscopic angle PA is 0 degree or 20 degrees, the corrected progressive surfaces can favorably correct the transmission refractive power. The surface power correction value in accordance with the changes in the pantoscopic angle PA is shown in the graphs (M) and (N) of FIG. 8.

Table 4 shows the surface power correction values.

In Embodiment 4, the vertical refractive power SV is 2.00 in accordance with the formula (1).

TABLE 4

| Vertical Refractive Power SV | Pantoscopic Angle PA | Surface Power Correction Value | |
|---|---|---|---|
| | | ΔDm (Yf) | ΔDm (Yn) |
| 2.00 | 0 | +0.1<<+0.2 | −0.4<<−0.3 |
| | 20 | −0.2 | 0.0<<+0.2 |

As shown in Table 4, when the pantoscopic angle PA is smaller than the standard pantoscopic angle PAo (PA<PAo) in a progressive power lens having progressive surfaces as both surfaces and a positive prescription of which vertical refractive power SV=+2.00 (D), the following relationships are satisfied:

ΔDm(Yf)≠ΔDm(Yn)

ΔDm(Yf)>0

ΔDm(Yn)<0

When the pantoscopic angle PA is larger than the standard pantoscopic angle PAo (PA>PAo), the following relationships are satisfied:

ΔDm(Yf)≠ΔDm(Yn)

ΔDm(Yf)<0

ΔDm(Yn)>0

Embodiment 5

Embodiment 5 is a progressive power lens of which outer surface is spherical and of which inner surface has a progressive surface for performing correction such as astigmatism correction.

The progressive power lens of Embodiment 5 has: a spherical power SPH of −3.00 diopter; a cylindrical power CYL of −2.00 diopter; a cylinder axis AX of 30 degrees; an addition power ADD of 2.50 diopter; a corridor length PL of 10 mm; a refractive index N of 1.67; and a base curve BC of 3.00 diopter.

Figure 9:
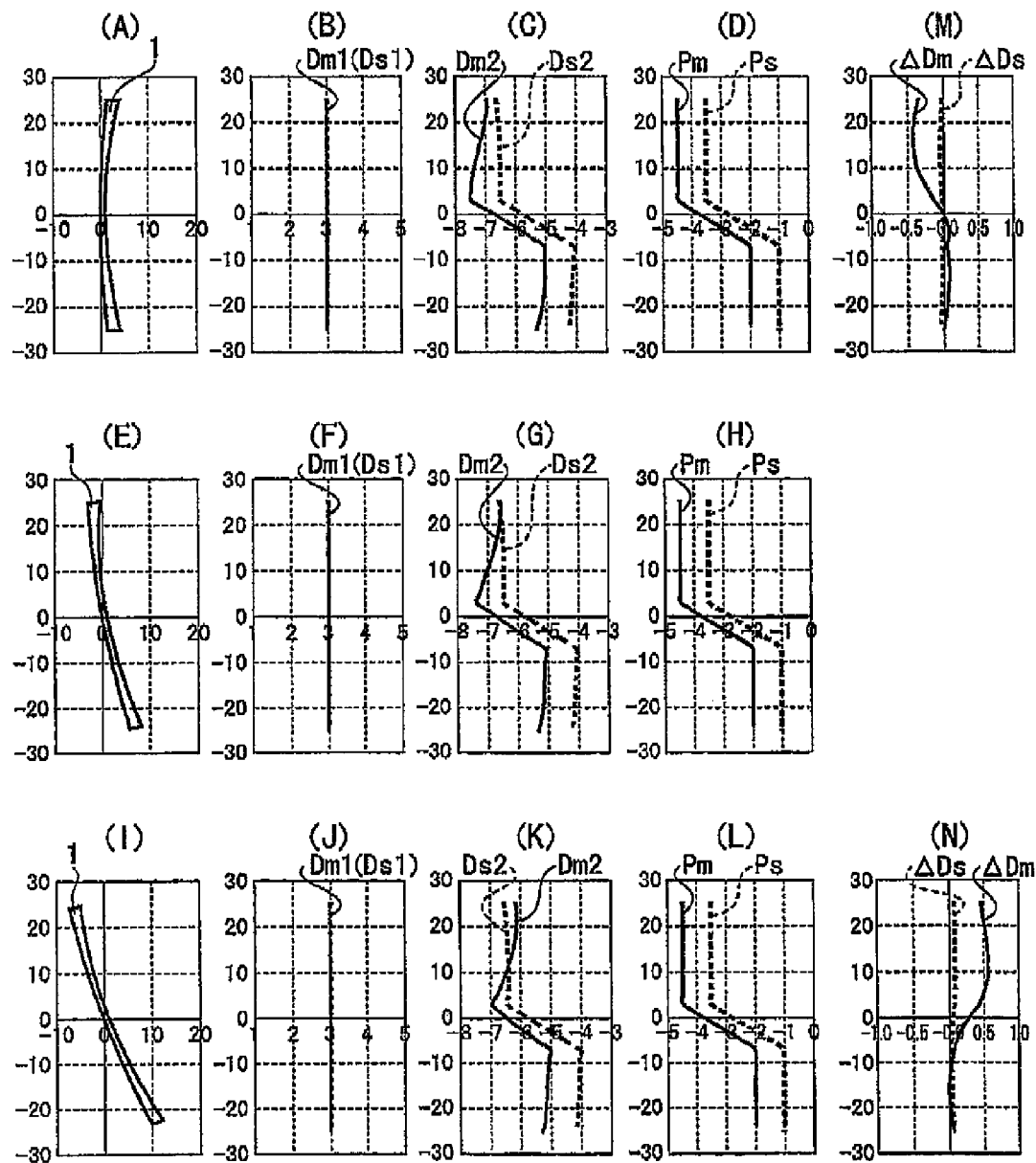
FIG. 9 shows graphs that show the optical characteristics of a progressive power lens according to Embodiment 5 of the invention, wherein the pantoscopic angle is varied to different angles.

FIG. 9 shows the results of Embodiment 5, of which arrangement is the same as that of FIG. 5.

In the graphs (B), (F) and (J) of FIG. 9, irrespective of the value of the pantoscopic angle PA, the outer surface is a common surface. Since the outer surface is spherical, Dm1 and Ds1 remain constant at the same value. On the other hand, as shown in the graphs (C), (G) and (K) of FIG. 9, since the inner surface is prescribed for astigmatism correction, Dm2 and Ds2 are basically of different values, and both of Dm2 and Ds2 exhibit progressive surface power changes. Ds2 changes in substantially the same manner irrespective of the change in the pantoscopic angle PA, and exhibits a surface power change observed in a typical progressive power lens. In contrast, Dm2 exhibits a greater change than Ds2 due to the correction.

As shown in the graph (H) of FIG. 9, owing to the corrected inner progressive surface, the transmission refractive power at the standard pantoscopic angle PA of 10 degrees has reached the targeted level suitable for, for example, astigmatism. On the other hand, as shown in the graphs (D) and (L) of FIG. 9, when the pantoscopic angle PA is 0 degree or 20 degrees, the corrected aspherical surface can favorably correct the transmission refractive power. The surface power correction value in accordance with the changes in the pantoscopic angle PA is shown in the graphs (M) and (N) of FIG. 9.

Table 5 shows the surface power correction values.

In Embodiment 5, the vertical refractive power SV is −4.50 in accordance with the formula (1).

TABLE 5

| Vertical Refractive Power SV | Pantoscopic Angle PA | Surface Power Correction Value | |
|---|---|---|---|
| | | ΔDm (Yf) | ΔDm (Yn) |
| −4.50 | 0 | −0.4<<−0.2 | 0.0<<+0.1 |
| | 20 | +0.5<<+0.6 | 0.0<<+0.1 |

As shown in Table 5, when the pantoscopic angle PA is smaller than the standard pantoscopic angle PAo (PA<PAo) in a progressive power lens for astigmatism use having an inner progressive surface and a negative prescription (SV<0) of which vertical refractive power SV=−4.50 (D), the following relationships are satisfied:

ΔDm(Yf)≠ΔDm(Yn)

ΔDm(Yf)<0

When the pantoscopic angle PA is larger than the standard pantoscopic angle PAo (PA>PAo), the following relationships are satisfied:

ΔDm(Yf)≠ΔDm(Yn)

ΔDm(Yf)>0

As appreciated from the above results of Embodiments 1 to 5, when the pantoscopic angle PA is deviated from the standard pantoscopic angle PAo, refractive power corrections of different amounts in terms of the total values of the surface powers of the outer surface and the inner surface are required to be performed at positions corresponding to the distance portion and the near portion on the main fixation line.

The correction direction (plus or minus) of the surface power correction value is defined as follows, based on whether the vertical refractive power SV is positive or negative and whether the change direction of the pantoscopic angle PA, i.e., ΔPA, is positive or negative:

ΔDm(Yf)>0 when SV<0 and ΔPA>0;

ΔDm(Yf)<0 when SV>0 and ΔPA>0;

ΔDm(Yf)<0 when SV<0 and ΔPA<0;

ΔDm(Yf)>0 when SV>0 and ΔPA<0;

ΔDm(Yn)>0 when SV>0 and ΔPA>0; and

ΔDm(Yn)<0 when SV>0 and ΔPA<0.

Specifically, by adjusting the correction value in accordance with the vertical refractive power SV, the optimal correction can be performed. This method is practicable, no matter whether the progressive surface of the progressive power lens is on the outer surface, the inner surface or both the surfaces. The correction of the surface power may be performed on the progressive surface, or on the other refractive surface of the lens that is not a progressive surface. Further, though not exemplified, the correction of the surface power may be performed on both of the outer surface and the inner surface in a divisional manner, which also provides the same advantages.

According to the exemplary embodiments as above, even when the pantoscopic angle is deviated from the standard angle of 10 degrees due to designs and materials of the spectacle frame, the refractive surface of the outer surface or the inner surface can be suitably corrected, thereby realizing as favorable optical performance as a lens placed at the standard pantoscopic angle PAo. Accordingly, retailers are not required to adjust the pantoscopic angle PA suitably for each user, but only required to measure the pantoscopic angle PA and communicate the measurement results to the manufacturers as custom information. Thus, retailers can save their time and labor.

It should be understood that the scope of the invention is not limited to the above-described exemplary embodiment(s) but includes any modifications and improvements as long as such modifications and improvements are compatible with the invention.

For instance, while the standard pantoscopic angle PAo is 10 degrees and the pantoscopic angle PA of a lens to be actually worn is 0 degree and 20 degrees in the above exemplary embodiments, the standard pantoscopic angle PAo and the pantoscopic angle PA of a lens to be actually worn are not limited to the such values in the invention.

The invention is applicable to progressive power lenses.

What is claimed is:

1. A progressive power lens, comprising:
a pair of an outer refractive surface and an inner refractive surface, at least one of the outer refractive surface and the inner refractive surface being a progressive surface, relationships as follows being defined with respect to a lens to be actually worn:

$$SV = SPH + CYL \cdot \{\cos(AX)\}^2 \quad (1);$$

$$Dm1 = (N-1) \cdot Cm1 \quad (2); \text{ and}$$

$$Dm2 = (1-N) \cdot Cm2 \quad (3),$$

where: SPH represents a spherical power; CYL represents a cylindrical power; AX represents a cylinder axis; ADD represents an addition power; N represents a refractive index of the lens; SV represents a vertical refractive power; Cm1 represents a curvature of a cross-section of an outer surface taken along a main fixation line; Cm2 represents a curvature of a cross-section of an inner surface taken along the main fixation line; Dm1 represents a surface power of the cross-section of the outer surface taken long the main fixation line; Dm2 represents a surface power of the cross-section of the inner surface taken along the main fixation line; PA represents a pantoscopic angle, the angle being defined as positive when formed in a direction in which the lens is laid down; Y represents a vertical distance from a prism reference point, the distance being defined as positive when taken in an upper direction of the lens fitted in a frame; Yf represents a Y-coordinate of a point located on the main fixation line and within an upper range of the vertical distance Y of 5<Y<15; and Yn represents a Y-coordinate of a point located on the main fixation line and within a lower range of the vertical distance Y of −15<Y<−5, relationships as follows being defined with respect to a lens designed for a standard pantoscopic angle:

$$Dm1o=(N-1)\cdot Cm1o \quad (2A); \text{ and}$$

$$Dm2o=(1-N)\cdot Cm2o \quad (3A),$$

where: Cm1o represents a curvature of a cross-section of an outer surface taken along the main fixation line; Cm2o represents a curvature of a cross-section of an inner surface taken along the main fixation line; Dm1o represents a surface power of the cross-section of the outer surface taken along the main fixation line; Dm2o represents a surface power of the cross-section of the inner surface taken along the main fixation line; and PAo represents a pantoscopic angle defined as positive when formed in a direction in which the lens is laid down, relationships as follows being defined:

$$\Delta PA = PA - PAo \quad (4); \text{ and}$$

$$\Delta Dm(Y) = \{Dm1(Y)+Dm2(Y)\} - \{Dm1o(Y)+Dm2o(Y)\} \quad (5),$$

where: ΔPA represents a deviation of the pantoscopic angle between the pantoscopic angle of the lens to be actually worn and the standard pantoscopic angle; and ΔDm(Y) represents a difference between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line, and relationships as follows being satisfied:

$$\Delta PA \neq 0 \text{ and } \Delta Dm(Yf) \neq \Delta Dm(Yn) \quad (6).$$

2. The progressive power lens according to claim 1, wherein the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line satisfy relationships as follows:

SV<0 and ΔPA>0 and ΔDm(Yf)>0.

3. The progressive power lens according to claim 1, wherein
the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line satisfy relationships as follows:

SV>0 and ΔPA>0 and ΔDm(Yf)<0.

4. The progressive power lens according to claim 1, wherein
the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line satisfy relationships as follows:

SV<0 and ΔPA<0 and ΔDm(Yf)<0.

5. The progressive power lens according to claim 1, wherein
the vertical refractive power SV, the deviation ΔPA of the pantoscopic angle between the pantoscopic angle of the lens to be actually worn and the standard pantoscopic angle, and a difference ΔDm(Yf) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yf located within the upper range of Y coordinates of the main fixation line satisfy relationships as follows:

SV>0 and ΔPA<0 and ΔDm(Yf)>0.

6. The progressive power lens according to claim 1, wherein
the vertical refractive power SV, the deviation ΔPA of the pantoscopic angle between the pantoscopic angle of the lens to be actually worn and the standard pantoscopic angle, and a difference ΔDm(Yn) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yn located within the lower range of Y coordinates of the main fixation line satisfy relationships as follows:

SV>0 and ΔPA>0 and ΔDm(Yn)>0.

7. The progressive power lens according to claim 1, wherein
the vertical refractive power SV, the deviation ΔPA of the pantoscopic angle between the pantoscopic angle of the lens to be actually worn and the standard pantoscopic angle, and a difference ΔDm(Yn) between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line at a position Yn located within the lower range of Y coordinates of the main fixation line satisfy relationships as follows:

$$SV>0 \text{ and } \Delta PA<0 \text{ and } \Delta Dm(Yn)<0.$$

8. The progressive power lens according to claim 1, wherein the progressive surface is formed on an inner surface of the lens.

9. The progressive power lens according to claim 1, wherein the progressive surface is formed on an outer surface of the lens.

10. A method of designing a progressive power lens that includes: a pair of an outer refractive surface and an inner refractive surface, at least one of the outer refractive surface and the inner refractive surface being a progressive surface, the method comprising:

designing the progressive surface to define relationships as follows with respect to a lens to be actually worn:

$$SV = SPH + CYL \cdot \{\cos(AX)\}^2 \quad (1);$$

$$Dm1 = (N-1) \cdot Cm1 \quad (2); \text{ and}$$

$$Dm2 = (1-N) \cdot Cm2 \quad (3),$$

where: SPH represents a spherical power; CYL represents a cylindrical power; AX represents a cylinder axis; ADD represents an addition power; N represents a refractive index of the lens; SV represents a vertical refractive power; Cm1 represents a curvature of a cross-section of an outer surface taken along a main fixation line; Cm2 represents a curvature of a cross-section of an inner surface taken along the main fixation line; Dm1 represents a surface power of the cross-section of the outer surface taken long the main fixation line; Dm2 represents a surface power of the cross-section of the inner surface taken along the main fixation line; PA represents a pantoscopic angle, the angle being defined as positive when formed in a direction in which the lens is laid down; Y represents a vertical distance from a prism reference point, the distance being defined as positive when taken in an upper direction of the lens fitted in a frame; Yf represents a Y-coordinate of a point located on the main fixation line and within the vertical distance Y of 5<Y<15; and Yn represents a Y-coordinate of a point located on the main fixation line and within the vertical distance Y of −15<Y<−5, designing the progressive surface to define relationships as follows with respect to a lens designed for a standard pantoscopic angle:

$$Dm1o = (N-1) \cdot Cm1o \quad (2A); \text{ and}$$

$$Dm2o = (1-N) \cdot Cm2o \quad (3A),$$

where: Cm1o represents a curvature of a cross-section of an outer surface taken along the main fixation line; Cm2o represents a curvature of a cross-section of an inner surface taken along the main fixation line; Dm1o represents a surface power of the cross-section of the outer surface taken along the main fixation line; Dm2o represents a surface power of the cross section of the inner surface taken along the main fixation line; and PAo represents a pantoscopic angle defined as positive when formed in a direction in which the lens is laid down, designing the progressive surface to define relationships as follows:

$$\Delta PA = PA - PAo \quad (4); \text{ and}$$

$$\Delta Dm(Y) = \{Dm1(Y) + Dm2(Y)\} - \{Dm1o(Y) + Dm2o(Y)\} \quad (5),$$

where: ΔPA represents a deviation of the pantoscopic angle between the pantoscopic angle of the lens to be actually worn and the standard pantoscopic angle; and ΔDm(Y) represents a difference between a sum of the surface powers of the cross-sections of the outer surface and the inner surface of the lens to be actually worn taken along the main fixation line and a sum of the surface powers of the cross-sections of the outer surface and the inner surface of the standard lens taken along the main fixation line, and designing the progressive surface to satisfy relationships as follows:

$$\Delta PA \neq 0 \text{ and } \Delta Dm(Yf) \neq \Delta Dm(Yn) \quad (6).$$

* * * * *